(12) United States Patent
Kazeto et al.

(10) Patent No.: US 11,939,441 B2
(45) Date of Patent: *Mar. 26, 2024

(54) WATER-SOLUBLE FILM, MANUFACTURING METHOD, AND PACKAGE

(71) Applicant: KURARAY CO., LTD., Okayama (JP)

(72) Inventors: Osamu Kazeto, Kurashiki (JP); Masahiro Takafuji, Saijo (JP)

(73) Assignee: KURARAY CO., LTD., Okayama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/036,639

(22) PCT Filed: Sep. 30, 2022

(86) PCT No.: PCT/JP2022/036859
§ 371 (c)(1),
(2) Date: May 11, 2023

(87) PCT Pub. No.: WO2023/054720
PCT Pub. Date: Apr. 6, 2023

(65) Prior Publication Data
US 2023/0323046 A1  Oct. 12, 2023

(30) Foreign Application Priority Data
Oct. 1, 2021  (JP) ................. 2021-163139

(51) Int. Cl.
C11D 17/00 (2006.01)
C08F 16/06 (2006.01)
C08J 5/18 (2006.01)
C08K 5/053 (2006.01)
C08L 29/04 (2006.01)

(52) U.S. Cl.
CPC .............. C08J 5/18 (2013.01); C08K 5/053 (2013.01); *C08F 16/06* (2013.01); *C08J 2300/14* (2013.01); *C08J 2329/04* (2013.01); *C11D 17/00* (2013.01)

(58) Field of Classification Search
None
See application file for complete search history.

(56) References Cited

U.S. PATENT DOCUMENTS

| | | |
|---|---|---|
| 2017/0247154 A1 | 8/2017 | Ieda et al. |
| 2017/0253708 A1 | 9/2017 | Ieda et al. |
| 2019/0194442 A1 | 6/2019 | Ieda et al. |
| 2021/0324160 A1 | 10/2021 | Okamoto et al. |
| 2021/0324163 A1 | 10/2021 | Okamoto et al. |
| 2023/0039669 A1 | 2/2023 | Shigemasa et al. |

FOREIGN PATENT DOCUMENTS

| | | | |
|---|---|---|---|
| JP | 2017-52897 A | 3/2017 | |
| WO | 2016/043009 A1 | 3/2016 | |
| WO | 2017/043505 A1 | 3/2017 | |
| WO | 2019/124262 A1 | 6/2019 | |
| WO | 2019/212723 A1 | 11/2019 | |
| WO | 2019/213347 A1 | 11/2019 | |
| WO | 2020/138441 A1 | 7/2020 | |
| WO | 2020/138444 A1 | 7/2020 | |
| WO | WO-2020138444 A1 * | 7/2020 | ............ B65D 65/46 |
| WO | 2021/145021 A1 | 7/2021 | |

OTHER PUBLICATIONS

International Search Report issued in corresponding International Patent Application No. PCT/JP2022/036859 dated Nov. 29, 2022.
Written Opinion issued in corresponding International Patent Application No. PCT/JP2022/036859 dated Nov. 29, 2022.

* cited by examiner

*Primary Examiner* — Richard A Huhn
(74) *Attorney, Agent, or Firm* — Morgan, Lewis & Bockius LLP

(57) ABSTRACT

The present disclosure relates to a water-soluble film with polyvinyl alcohol having a polymerization degree of 100 to 3,000 and a polyhydric alcohol plasticizer.

20 Claims, No Drawings

WATER-SOLUBLE FILM, MANUFACTURING METHOD, AND PACKAGE

TECHNICAL FIELD

The invention relates to a water-soluble film containing polyvinyl alcohol that is suitably used for packaging various chemical agents and the like, and a manufacturing method for the water-soluble film and a packaging material using the water-soluble film.

A water-soluble film has been used in a wide range of applications, including packaging of various chemical agents such as a liquid detergent and an agricultural chemical, and seed tapes containing seeds, by utilizing its excellent solubility in water. Polyvinyl alcohol (hereinafter, may be referred to as PVA) has been mainly used in the water-soluble film used in such applications. It is known that water solubility of the water-soluble film can be enhanced by blending various additives such as a plasticizer in the water-soluble film containing polyvinyl alcohol, or by using modified polyvinyl alcohol into which a carboxyl group is introduced as a raw material of the water-soluble film.

In recent years, among these applications, applications in which a chemical agent such as a household laundry detergent is packaged with a water-soluble film to form a package have been widely spread. In general, when the package is manufactured, the chemical agent is packaged in a state where tension is applied to the water-soluble film, such that it is often the case that wrinkles generated in the package are suppressed and excellent appearance is shown. However, when the package under such tension is stored for a long period of time, there is a problem that the tension of the package is lost over time and the appearance becomes poor.

To solve such a problem, Patent Literature 1 proposes a water-soluble film containing a PVA-based resin and a plasticizer, in which an area change rate when the water-soluble film is immersed in a predetermined solution exhibits a specific value. According to the water-soluble film, it is possible to obtain a water-soluble film capable of forming an excellent package that does not impair water solubility of the water-soluble film and does not impair tension of the water-soluble film over time even in a state where a liquid such as a liquid detergent is packaged to form a package.

CITATION LIST

Patent Literature

Patent Literature 1: WO 2017/043505 A

SUMMARY OF INVENTION

Technical Problem

However, in recent years, it has been found that even in a case of a package using the water-soluble film described in Patent Literature 1, when the package is stored in a high-temperature environment for a long period of time, such as transportation by sea in a container or the like, the chemical agent in the package volatilizes to the outside over time and the amount of the chemical agent decreases, which may cause wrinkles in the package. Such a problem tends to appear more prominently due to thinning of a packaging film associated with environmental problems in recent years.

The phenomenon in which the chemical agent in the package volatilizes to the outside over time is caused by a barrier performance of the water-soluble film used for the package. That is, PVA contained in the water-soluble film has an excellent barrier performance as compared with general polymers, and particularly exhibits a significantly excellent barrier performance to non-polar substances such as gases such as oxygen and hydrogen and lipophilic substances such as olefins, but the barrier performance to substances having a relatively small molecular weight and high polarity such as water, a lower alcohol, and a lower fatty acid is not so high. Here, a main component of a chemical agent such as a household laundry detergent packaged in the package is a surfactant, and in particular, there are many substances having a relatively low molecular weight and high polarity. Therefore, even in a package in which a chemical agent such as a household laundry detergent is packaged with a water-soluble film containing PVA having an excellent barrier performance, the chemical agent in the package volatilizes over time when the package is stored at a high temperature for a long period of time.

It is presumed that the barrier performance of the water-soluble film containing PVA is strongly affected by affinity between the packaged chemical agent and the water-soluble film and a crystal structure of PVA such as a PVA crystal or PVA amorphous structure in the water-soluble film. On the other hand, it is presumed that a dimensional change (area change rate) of the water-soluble film containing PVA is strongly affected by residual stress from a film forming process present in the water-soluble film in addition to the affinity between the packaged chemical agent and the water-soluble film. Therefore, it is presumed that even in the package using a water-soluble film exhibiting a specific value of an area change rate as described in Patent Literature 1, the barrier performance of the water-soluble film is not sufficient, and when the package is stored in a high-temperature environment for a long period of time, wrinkles may occur in the package, and appearance defects may occur over time.

A relationship between the barrier performance of the water-soluble film containing PVA, the affinity between the packaged chemical agent and the water-soluble film, and the crystal structure of PVA such as a PVA crystal or PVA amorphous structure in the water-soluble film is presumed as follows. First, it is considered that a surfactant that is a main component of the packaged chemical agent and is also a component that permeates the water-soluble film cannot permeate a PVA crystal part in the water-soluble film. Therefore, the barrier performance of the water-soluble film tends to be improved as the amount of PVA crystals in the water-soluble film increases. On the other hand, the surfactant can diffuse a PVA amorphous part in the water-soluble film, but a diffusion rate thereof is considered to depend on the mobility of the molecules of the PVA polymer in the PVA amorphous (ease of opening a gap between the PVA polymer molecules) and the affinity between the surfactant and the PVA polymer molecules. However, the barrier performance tends to be reduced, as a density of the PVA amorphous part is lower, an interaction between the PVA polymer molecules is weaker, and the affinity between the surfactant and the PVA polymer molecules is higher.

An object of the present invention is to provide a water-soluble film that maintains excellent water solubility and does not cause occurrence of appearance defects over time during long-term storage at a high temperature even when a chemical agent such as a laundry detergent is packaged, a method for manufacturing the water-soluble film, and a package in which a chemical agent is packaged using the water-soluble film.

Solution to Problem

As a result of intensive studies, the present inventors have found that the above problem can be solved by setting a weight reduction rate of a package in which a model detergent is packaged with a water-soluble film, an elastic modulus after the water-soluble film is immersed in the model detergent, and a complete dissolution time when the water-soluble film is immersed in deionized water after being immersed in the model detergent, to specific ranges. Then, the present inventors have further conducted studies based on such findings, thereby completing the present invention.

That is, the present invention relates to:

[1] A water-soluble film comprising polyvinyl alcohol having a polymerization degree of 100 to 3,000 and a polyhydric alcohol plasticizer in an amount of 1 to 50 parts by mass with respect to 100 parts by mass of the polyvinyl alcohol, wherein in a case where the water-soluble film is used for a package in which a model detergent is packaged, the model detergent containing 8.6 mass % of monoethanolamine, 23.8 mass % of dodecylbenzenesulfonic acid, 9.5 mass % of propylene glycol, 23.8 mass % of a lauryl alcohol ethoxylate-7 ethylene oxide adduct, 19.1 mass % of oleic acid, 9.5 mass % of diethylene glycol, and 5.7 mass % of water, a weight reduction rate of the package when the package is stored at 23° C. and 50% RH is 1.0 to 6.0 g/(m$^2$·day) per surface area of the water-soluble film in contact with the model detergent of the package, when the water-soluble film is immersed in the model detergent in an environment of 23° C. and 50% RH for 24 hours and then a tensile test is performed at 23° C. and 50% RH, an elastic modulus of the water-soluble film when the water-soluble film is stretched to 100% is 9 to 35 MPa, and when the water-soluble film is immersed in the model detergent in an environment of 23° C. and 50% RH for 24 hours and then the water-soluble film is immersed in deionized water at 5° C., a complete dissolution time is within 100 seconds.

Furthermore, the present invention relates to:

[2] The water-soluble film according to [1], wherein the polyvinyl alcohol is carboxylic acid modified or sulfonic acid modified polyvinyl alcohol, and is polyvinyl alcohol having a saponification degree of 85 mol % or more.

[3] The water-soluble film according to [1] or [2], wherein a thickness of the water-soluble film is 5 to 80 µm.

[4] A method for manufacturing the water-soluble film according to any one of [1] to [3] by casting a film forming stock solution containing polyvinyl alcohol into a film shape onto a support from a die through a die lip and drying the film forming stock solution, wherein a draft ratio obtained by dividing a linear velocity of the support on which the film forming stock solution is cast by a linear velocity of the film forming stock solution at the die lip is 2 to 60, and a draw ratio obtained by dividing a winding speed of the film after drying by the linear velocity of the support is 0.95 to 1.8.

[5] The method for manufacturing the water-soluble film according to [4], wherein the method includes a step of heat-treating the water-soluble film at 80 to 300° C.

[6] A package wherein the water-soluble film according to any one of [1] to [3] contains a chemical agent.

[7] The package according to [6], wherein the chemical agent is an agricultural chemical, a detergent, or a disinfectant.

[8] The package according to [6] or [7], wherein the chemical agent is a liquid form.

Advantageous Effects of Invention

According to the present invention, a water-soluble film that maintains excellent water solubility and does not cause occurrence of appearance defects over time during long-term storage at a high temperature even when a chemical agent such as a laundry detergent is packaged, a method for manufacturing the water-soluble film, and a package in which a chemical agent is packaged using the water-soluble film are provided.

DESCRIPTION OF EMBODIMENTS

Hereinafter, the present invention will be specifically described.

<Model Detergent>

In the present invention, a model detergent simulating a household laundry detergent refers to a detergent having the following composition.

Monoethanolamine 8.6 mass %
Dodecylbenzenesulfonic acid 23.8 mass %
Propylene glycol 9.5 mass %
Lauryl alcohol ethoxylate-7 ethylene oxide adduct 23.8 mass %
Oleic acid 19.1 mass %
Diethylene glycol 9.5 mass %
Water 5.7 mass %

<Weight Reduction Rate of Model Detergent Package>

In the present invention, in a case where the water-soluble film is used for a package in which the model detergent is packaged (hereinafter, may be referred to as a model detergent package), a weight reduction rate of the package when the package is stored at 23° C. and 50% RH is measured by the following methods <1> to <8>.

<1> Two test pieces having a size of 7 cm×7 cm were cut out from the water-soluble film.
<2> Two cut films are overlapped with each other, and three sides thereof are heat-sealed with a seal width of 1 cm, thereby preparing a pouch with one open side.
<3> The pouch is stored in a room at 23° C. and 50% RH for 16 hours or longer for humidity control.
<4> A weight of the pouch in an empty state is measured.
<5> About 10 g of the model detergent is put into the humidity-controlled pouch, and the remaining one side is heat-sealed with a seal width of 1 cm while no air is left in the pouch, thereby preparing a pouch containing the model detergent in which an area of an unsealed part is 5 cm×5 cm.
<6> A mass of the prepared pouch is measured.
<7> The pouch is stored in a room at 23° C. and 50% RH, and the mass of the pouch is periodically measured.
<8> In a graph in which the horizontal axis represents the storage time and the vertical axis represents the pouch weight, the storage is continued until the pouch weight decreases at a constant rate, and when the pouch weight decreases linearly, the weight reduction rate per unit area of the model detergent is obtained from the inclination and a surface area of the unsealed part of the pouch (about 50 cm$^2$=5 cm×5 cm×2).

In the present invention, the weight reduction rate of the model detergent package of the water-soluble film is 1.0 to 6.0 g/(m$^2$·day). When the weight reduction rate exceeds 6.0 g/(m$^2$·day), problems such as a change in composition of the chemical agent over time and a decrease in amount of the packaged chemical agent easily occur. An upper limit of the weight reduction rate is 5.0 g/(m²·day) or less, more preferably 4.0 g/(m²·day) or less, still more preferably 3.5 g/(m²·day) or less, and particularly preferably 3.0 g/(m²·day) or less. On the other hand, when the weight reduction rate is less than 1.0 g/(m²·day), the water solubility of the film may be insufficient. A lower limit of the weight reduction rate is 1.2 g/(m²·day) or more, more preferably 1.4 g/(m²·day) or more, still more preferably 1.6 g/(m²·day) or more, and particularly preferably 1.8 g/(m²·day) or more.

It is presumed that the weight reduction rate of the model detergent package of the water-soluble film is strongly affected by affinity between the packaged model detergent and the water-soluble film and a crystal structure of PVA such as a PVA crystal or PVA amorphous structure in the water-soluble film. Therefore, the weight reduction rate of the model detergent package of the water-soluble film can be controlled by adjusting the composition of the water-soluble film (for example, a saponification degree and a modification degree of PVA, a type and a content of the plasticizer, and the additives) and film forming conditions (a draft ratio, drying conditions, a draw ratio, and the like).

<Elastic Modulus of Water-Soluble Film When Stretched to 100%>

In the present invention, when a water-soluble film is immersed in the model detergent in an environment of 23° C. and 50% RH for 24 hours and then a tensile test is performed at 23° C. and 50% RH, an elastic modulus when the water-soluble film is stretched to 100% (hereinafter, may be referred to as an elastic modulus when the water-soluble film is stretched to 100%) is measured by the following methods <1> to <4>.

<1> A test piece having a size of 1.5 cm in width direction×15 cm in length direction is cut out from the water-soluble film.

<2> The cut test piece is stored in a room at 23° C. and 50% RH for 16 hours or longer for humidity control.

<3> The humidity-controlled test piece is immersed in the model detergent whose mass is 100 times or more the mass of the film in an environment of 23° C. and 50% RH for 24 hours.

<4> After the test piece is taken out from the model detergent and the model detergent attached to a surface of the test piece is quickly wiped off with filter paper, the test piece is subjected to a tensile test using a tensile tester under the following conditions, and an elastic modulus is determined from an inclination of a chart at the time when a chuck interval is doubled from the original interval.

Device: AG-D type manufactured by Shimadzu Corporation

Chuck interval: 100 mm

Chuck speed: 100 mm/min

Measurement atmosphere: 23° C., 50% RH

In the present invention, an elastic modulus of the water-soluble film when the water-soluble film is stretched to 100% is 9 to 35 MPa. When the elastic modulus when the water-soluble film is stretched to 100% exceeds 35 MPa, the water solubility may be insufficient. An upper limit of the elastic modulus when the water-soluble film is stretched to 100% is preferably 33 MPa or less, more preferably 30 MPa or less, and still more preferably 28 MPa or less. On the other hand, the elastic modulus when the water-soluble film is stretched to 100% is less than 9 MPa, appearance defects such as wrinkles associated with a decrease in amount of the chemical agent may occur in the package in which the chemical agent is packaged. A lower limit of the elastic modulus when the water-soluble film is stretched to 100% is preferably 11 MPa or more, more preferably 18 MPa or more, and still more preferably 23 MPa or more.

It is presumed that the elastic modulus of the water-soluble film when the water-soluble film is stretched to 100% is strongly affected by a crystal structure of PVA such as a PVA crystal or PVA amorphous structure in the water-soluble film. Therefore, the elastic modulus of the water-soluble film when the water-soluble film is stretched to 100% can be controlled by adjusting the composition of the water-soluble film (for example, the saponification degree and the modification degree of PVA, the type and the content of the plasticizer, and the additives) and the film forming conditions (the draft ratio, the drying conditions, the draw ratio, and the like).

<Complete Dissolution Time of Water-Soluble Film>

In the present invention, a complete dissolution time when the water-soluble film is immersed in deionized water at 5° C. after being immersed in the model detergent in an environment of 23° C. and 50% RH for 24 hours (hereinafter, may be referred to as a complete dissolution time) is measured by the following methods <1> to <6>.

<1> The water-soluble film is placed in a thermo-hygrostat adjusted to 20° C. and 65% RH for 16 hours or longer for humidity control.

<2> After a rectangular sample having a size of 40 mm in length ×35 mm in width is cut out from the humidity-controlled water-soluble film, the rectangular sample is immersed in the model detergent whose mass is 100 times or more the mass of the film in an environment of 23° C. and 50% RH for 24 hours.

<3> 300 mL of deionized water is placed in a 500 mL beaker, and a water temperature is adjusted to 5±0.3° C. while stirring with a magnetic stirrer equipped with a bar having a length of 3 cm at a rotation speed of 280 rpm.

<4> After the film sample is taken out from the model detergent and the model detergent attached to the surface is quickly wiped off with filter paper, the film sample is interposed and fixed between two plastic plates having a size of 50 mm×50 mm with a rectangular opened window (hole) having a size of 35 mm in length×23 mm in width so that a length direction of the film sample is parallel to a length direction of the window and the sample is positioned at substantially the center in a width direction of the window.

<5> The sample fixed to the plastic plates in <4> above is immersed in deionized water in the beaker while being careful not to be in contact with the bar of the magnetic stirrer.

<6> A time until the sample immersed in deionized water completely disappears from immersion in deionized water is measured.

Note that, in the present invention, "the sample completely disappears" means that a visually recognizable undissolved residue of the water-soluble film becomes invisible.

In the present invention, the complete dissolution time of the water-soluble film is within 100 seconds. When the complete dissolution time exceeds 100 seconds, the water solubility of the water-soluble film is insufficient, and it may be difficult to use the water-soluble film for packaging various chemical agents such as a liquid detergent and an agricultural chemical. An upper limit of the complete dissolution time is preferably within 90 seconds, more preferably within 75 seconds, and still more preferably within 60 seconds. On the other hand, a lower limit of the complete dissolution time is not particularly limited, but when the complete dissolution time is too short, the water-soluble film absorbs moisture in the air, blocking occurs between the water-soluble films, and the strength of the water-soluble film tends to be easily reduced. The lower limit of the complete dissolution time is preferably 5 seconds or longer, more preferably 10 seconds or longer, still more preferably 15 seconds or longer, and particularly preferably 20 seconds or longer.

It is presumed that the complete dissolution time of the water-soluble film is strongly affected by the affinity of PVA with water and the crystal structure of PVA such as a PVA crystal or PVA amorphous structure in the water-soluble film. Therefore, the complete dissolution time of the water-soluble film can be controlled by adjusting the composition of the water-soluble film (for example, the saponification degree and the modification degree of PVA, and the type and the content of the plasticizer) and the film forming conditions (the draft ratio, the drying conditions, the draw ratio, and the like).

<Thickness of Water-Soluble Film>

An upper limit of the thickness of the water-soluble film of the present invention is preferably 80 μm or less, more preferably 70 μm or less, still more preferably 60 μm or less, and particularly preferably 50 μm or less. When the thickness of the water-soluble film is equal to or less than the above upper limit, it is easy to sufficiently ensure the water solubility of the water-soluble film. On the other hand, the thickness of the water-soluble film is preferably 5 μm or more, more preferably 10 μm or more, still more preferably 15 μm or more, and particularly preferably 20 μm or more. When the thickness of the water-soluble film is equal to or more than the above lower limit, it is easy to prevent holes from being formed when the water-soluble film is used for a model detergent package, and it is easy to prevent the weight reduction rate of the water-soluble film from being too high. Note that the thickness of the water-soluble film can be determined as an average value of thicknesses measured at 10 arbitrary locations (for example, 10 arbitrary locations on a straight line drawn in the length direction of the water-soluble film).

<PVA>

The water-soluble film of the present invention contains PVA. As PVA, PVA produced by saponifying a vinyl ester polymer obtained by polymerizing a vinyl ester monomer can be used. Examples of the vinyl ester monomer include vinyl formate, vinyl acetate, vinyl propionate, vinyl valerate, vinyl laurate, vinyl stearate, vinyl benzoate, vinyl pivalate, and vinyl versatate, and among them, vinyl acetate is preferable.

The vinyl ester polymer is preferably obtained using only one or two or more vinyl ester monomers as a monomer, and more preferably obtained using only one vinyl ester monomer as a monomer. However, the vinyl ester polymer may be a copolymer of one or two or more vinyl ester monomers and other monomers copolymerizable therewith.

Examples of the other monomers copolymerizable with such a vinyl ester monomer include ethylene; an olefin having 3 to 30 carbon atoms such as propylene, 1-butene, or isobutene; an acrylic acid or a salt thereof; an acrylic acid ester such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, or octadecyl acrylate; a methacrylic acid or a salt thereof; a methacrylic acid ester such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, or octadecyl methacrylate; acrylamide, or an acrylamide derivative such as N-methylacrylamide, N-ethylacrylamide, N,N-dimethylacrylamide, diacetoneacrylamide, acrylamidopropanesulfonic acid or a salt thereof, acrylamidopropyldimethylamine or a salt thereof, or N-methylolacrylamide or a derivative thereof; methacrylamide, or a methacrylamide derivative such as N-methylmethacrylamide, N-ethylmethacrylamide, methacrylamidopropanesulfonic acid or a salt thereof, methacrylamidopropyldimethylamine or a salt thereof, or N-methylolmethacrylamide or a derivative thereof; N-vinylamide such as N-vinylformamide, N-vinylacetamide, or N-vinylpyrrolidone; a vinyl ether such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, or stearyl vinyl ether; a vinyl cyanide such as acrylonitrile or methacrylonitrile; a vinyl halide such as vinyl chloride, vinylidene chloride, vinyl fluoride, or vinylidene fluoride; an allyl compound such as allyl acetate or allyl chloride; maleic acid or a salt, ester, or anhydride thereof; itaconic acid or a salt, ester, or anhydride thereof; a vinylsilyl compound such as vinyltrimethoxysilane; and isopropenyl acetate. The vinyl ester polymer can have a structural unit derived from one or two or more of these other monomers.

Among the other monomers copolymerizable with the vinyl ester monomer, in a case of a monomer that produces bulky functional groups in the polymer side chain after polymerization and saponification, the crystal structure of PVA in the obtained water-soluble film tends to be disturbed, and the weight reduction rate of the model detergent package of the water-soluble film tends to be too high, which is not preferable. In addition, in a case of the other monomers having a long-chain alkyl group, affinity with a component of a model detergent having a long-chain alkyl group is high, which is also not preferable. From this viewpoint, as the other monomers copolymerizable with the vinyl ester monomer, olefins having a small number of carbon atoms such as ethylene and propylene, a carboxylic acid-based monomer such as an acrylic acid or a methacrylic acid, or a sulfonic acid-based monomer is preferable.

PVA contained in the water-soluble film of the present invention is preferably carboxylic acid modified PVA obtained by saponifying a carboxylic acid-vinyl acetate copolymer obtained by copolymerizing vinyl acetate and a carboxylic acid monomer. An upper limit of a modification degree of the carboxylic acid modified PVA is preferably 10 mol % or less, more preferably 8 mol % or less, and still more preferably 6 mol % or less. On the other hand, a lower limit of the modification degree of the carboxylic acid modified PVA is preferably 0.5 mol % or more, more preferably 1 mol % or more, and still more preferably 2 mol % or more.

PVA contained in the water-soluble film of the present invention is also preferably sulfonic acid modified PVA obtained by saponifying a sulfonic acid-vinyl acetate copolymer obtained by copolymerizing vinyl acetate and a sulfonic acid monomer. An upper limit of a modification degree of the sulfonic acid modified PVA is preferably 8 mol % or less, more preferably 6 mol % or less, and still more preferably 4 mol % or less. On the other hand, a lower limit of the modification degree of the sulfonic acid modified PVA is preferably 0.3 mol % or more, more preferably 0.7 mol % or more, and still more preferably 1 mol % or more.

An upper limit of a proportion of structural units derived from the other monomers in the vinyl ester polymer is preferably 15 mol % or less, and more preferably 5% mol % or less, based on the number of moles of all the structural units constituting the vinyl ester polymer, from the viewpoint of water solubility of the water-soluble film and suppression of perforation.

In the present invention, a polymerization degree of PVA contained in the water-soluble film is 100 to 3,000. When the polymerization degree of PVA is less than 100, the strength of the water-soluble film may be insufficient. A lower limit of the polymerization degree of PVA is preferably 200 or more, more preferably 300 or more, and still more preferably 500 or more. On the other hand, when the polymerization degree of PVA exceeds 3,000, it may be difficult to ensure the productivity of PVA and the water-soluble film and the water solubility of the water-soluble film. An upper limit of the polymerization degree of PVA is preferably 2,500 or less, more preferably 2,000 or less, and still more preferably 1,500 or less. Here, the polymerization degree means an average polymerization degree (Po) measured according to the description of JIS K6726-1994, and is determined from an intrinsic viscosity [η] (deciliter/g) measured in water at 30° C. after re-saponification and purification of PVA by the following equation.

$$Po=([\eta] \times 10^4/8.29)^{(1/0.62)}$$

In the present invention, a saponification degree of PVA contained in the water-soluble film is preferably 80 to 99.5 mol %. Here, the saponification degree of PVA refers to a proportion (mol %) of the number of moles of the vinyl alcohol unit to the total number of moles of the structural unit (typically, a vinyl ester monomer unit) that can be converted into a vinyl alcohol unit by saponification and the vinyl alcohol unit that are included in PVA. The saponification degree of PVA can be measured according to the description of JIS K6726-1994.

Among these kinds of PVA, in cases of unmodified PVA and hydrophobic ethylene modified PVA, the number of acetic acid groups that disturb the crystal structure of PVA in the water-soluble water is smaller as a saponification degree is higher, and thus the weight reduction rate of the model detergent package of the water-soluble film tends to decrease, but when the saponification degree is too high, the water solubility of the water-soluble film may be reduced. Since it is easy to achieve both the weight reduction rate of the model detergent package of the water-soluble film and the water solubility of the water-soluble film, an upper limit of the saponification degree of each of the unmodified PVA and ethylene modified PVA is preferably 99.5 mol % or less, more preferably 97 mol % or less, still more preferably 95 mol % or less, and particularly preferably 93 mol % or less. On the other hand, a lower limit of the saponification degree of each of the unmodified PVA and ethylene modified PVA is preferably 80 mol % or more, more preferably 83 mol % or more, still more preferably 85 mol % or more, and particularly preferably 87 mol % or more. When the saponification degree of each of the unmodified PVA and ethylene modified PVA is equal to or more than the above lower limit, the weight reduction rate of the model detergent package of the water-soluble film and the elastic modulus of the water-soluble film when the water-soluble film is stretched to 100% are easily controlled. Note that the unmodified PVA is PVA obtained by saponifying a vinyl acetate homopolymer obtained by homopolymerization of vinyl acetate. In addition, the ethylene modified PVA is PVA obtained by saponifying an ethylene-vinyl acetate copolymer obtained by copolymerization of vinyl acetate and ethylene.

Among these kinds of PVA, in the cases of the carboxylic acid modified PVA and sulfonic acid modified PVA, since a carboxyl group and a sulfone group to be introduced are hydrophilic groups, the water solubility of the water-soluble film is good even when the saponification degree is high. An upper limit of a saponification degree of each of the carboxylic acid modified PVA and sulfonic acid modified PVA is preferably 99 mol % or less, more preferably 97 mol % or less, and still more preferably 96 mol % or less. On the other hand, a lower limit of the saponification degree of each of the carboxylic acid modified PVA and sulfonic acid modified PVA is preferably 85 mol % or more, more preferably 90 mol % or more, and still more preferably 93 mol % or more. When the saponification degree of each of the carboxylic acid modified PVA and sulfonic acid modified PVA is equal to or more than the above lower limit, the weight reduction rate of the model detergent package of the water-soluble film and the elastic modulus of the water-soluble film when the water-soluble film is stretched to 100% are easily controlled.

In the water-soluble film in the present invention, one kind of PVA may be used alone as PVA, or two or more kinds of PVA having different polymerization degrees, saponification degrees, modification degrees, or the like may be blended and used.

In the present invention, an upper limit of a content of PVA in the water-soluble film is not particularly limited, but a lower limit of the content of PVA is preferably 50 mass % or more, more preferably 80 mass % or more, and still more preferably 85 mass % or more.

<Polyhydric Alcohol Plasticizer>

In the present invention, the water-soluble film contains a polyhydric alcohol plasticizer in an amount of 1 to 50 parts by mass with respect to 100 parts by mass of PVA. When the content of the polyhydric alcohol plasticizer is less than 1 part by mass, the water solubility of the water-soluble film is reduced, and the complete dissolution time tends to become too long. The content of the polyhydric alcohol plasticizer is preferably 3 parts by mass or more and more preferably 5 parts by mass or more. On the other hand, when the content of the polyhydric alcohol plasticizer exceeds 50 parts by mass, the weight reduction rate of the model detergent package of the water-soluble film may be too high, and the elastic modulus of the water-soluble film when the water-soluble film is stretched to 100% may be too low. The content of the polyhydric alcohol plasticizer is preferably 40 parts by mass or less and more preferably 30 parts by mass or less.

In the present invention, examples of the polyhydric alcohol plasticizer contained in the water-soluble film include ethylene glycol, glycerin, diglycerin, propylene glycol, diethylene glycol, triethylene glycol, tetraethylene glycol, trimethylolpropane, and sorbitol. These polyhydric alcohol plasticizers may be used alone or in a combination of two or more thereof. Among these polyhydric alcohol plasticizers, ethylene glycol or glycerin is preferable, and glycerin is more preferable, from the viewpoint of difficulty in bleeding out to the surface of the water-soluble film. Note that, when the polyhydric alcohol plasticizer is added to a film forming stock solution of the water-soluble film, the polyhydric alcohol plasticizer can be contained in the obtained water-soluble film. In addition, a proportion of the content of the polyhydric alcohol plasticizer in the water-soluble film is substantially equal to a proportion of the amount of polyhydric alcohol plasticizer added in the film forming stock solution of the water-soluble film.

The reason why the weight reduction rate of the model detergent package of the water-soluble film, the elastic modulus when the water-soluble film is stretched to 100%, and the complete dissolution time (hereinafter, referred to as a weight reduction rate of the model detergent package of the water-soluble film and the like) can be controlled by adjusting the content of the polyhydric alcohol plasticizer in the water-soluble film is presumed as follows. First, as described above, since the proportion of the content of the polyhydric alcohol plasticizer in the water-soluble film is substantially equal to the proportion of the amount of polyhydric alcohol plasticizer added in the film forming stock solution in the water-soluble film, the adjustment of the content of the polyhydric alcohol plasticizer in the water-soluble film is substantially equal to the adjustment of the amount of polyhydric alcohol plasticizer added in the film forming stock solution in the water-soluble film. Then, when the amount of polyhydric alcohol plasticizer added in the film forming stock solution in the water-soluble film is appropriately adjusted, the mobility of the PVA molecules is likely to be increased when a PVA film obtained by casting the film forming stock solution onto a support described below is dried, thus PVA crystals are likely to be formed in the water-soluble film. As described above, since the weight reduction rate of the model detergent package of the water-soluble film and the like are presumed to depend on the amount of PVA crystals contained in the water-soluble film, it is presumed that the weight reduction rate of the model detergent package of the water-soluble film and the like can be controlled by adjusting the amount of polyhydric alcohol plasticizer added in the film forming stock solution of the water-soluble film. Note that, in a case where the amount of polyhydric alcohol plasticizer added in the film forming stock solution of the water-soluble film is too small, the mobility of the PVA molecules is decreased when the PVA film obtained by casting the film forming stock solution onto the support is dried, such that it is difficult to form PVA crystals in the water-soluble film. In addition, even in a case where the amount of polyhydric alcohol plasticizer in the film forming stock solution of the water-soluble film is too large, the interaction between PVA and the polyhydric alcohol plasticizer is strengthened, such that the interaction between the PVA molecules is reduced when the PVA film obtained by casting the film forming stock solution onto the support is dried, such that it is difficult to form PVA crystals in the water-soluble film.

<Starch/Water-Soluble Polymer>

In order to impart mechanical strength to the water-soluble film or maintain handleability of the water-soluble film, the water-soluble film of the present invention may contain a water-soluble polymer other than starch and/or PVA.

Examples of the starch include natural starches such as corn starch, potato starch, sweet potato starch, wheat starch, rice starch, tapioca starch, and sago starch; and modified starches that are etherified, esterified, oxidized, and the like, and modified starches are more preferable.

An upper limit of a content of the starch in the water-soluble film is preferably 15 parts by mass or less, and more preferably 10 parts by mass or less, with respect to 100 parts by mass of PVA. When the content of the starch is equal to or less than the above upper limit, it is easy to prevent process passability during manufacturing of the water-soluble film from deteriorating.

Examples of the water-soluble polymer other than PVA include dextrin, gelatin, glue, casein, shellac, gum arabic, polyacrylic acid amide, sodium polyacrylate, polyvinyl methyl ether, a copolymer of methyl vinyl ether and maleic anhydride, a copolymer of vinyl acetate and itaconic acid, polyvinylpyrrolidone, cellulose, acetyl cellulose, acetyl butyl cellulose, carboxymethyl cellulose, methyl cellulose, ethyl cellulose, hydroxyethyl cellulose, and sodium alginate.

An upper limit of a content of the water-soluble polymer other than PVA in the water-soluble film is preferably 15 parts by mass or less, and more preferably 10 parts by mass or less, with respect to 100 parts by mass of PVA. When the content of the water-soluble polymer is equal to or less than the above upper limit, it is easy to prevent the water solubility of the water-soluble film from being impaired.

<Surfactant>

In the present invention, the water-soluble film preferably contains a surfactant from the viewpoint of the handleability thereof and the improvement of the peelability from a film forming apparatus when the water-soluble film is manufactured. The type of surfactant is not particularly limited, and examples thereof include an anionic surfactant and a nonionic surfactant.

Examples of the anionic surfactant include a carboxylic acid type surfactant such as potassium laurate; a sulfuric acid ester type surfactant such as octyl sulfate; and a sulfonic acid type surfactant such as dodecylbenzenesulfonate.

Examples of the nonionic surfactant include an alkyl ether type surfactant such as polyoxyethylene lauryl ether or polyoxyethylene oleyl ether; an alkylphenyl ether type surfactant such as polyoxyethylene octylphenyl ether; an alkyl ester type surfactant such as polyoxyethylene laurate; an alkylamine type surfactant such as polyoxyethylene lauryl amino ether; an alkylamide type surfactant such as polyoxyethylene lauric acid amide; a polypropylene glycol ether type surfactant such as polyoxyethylene polyoxypropylene ether; an alkanolamide type surfactant such as lauric acid diethanolamide or oleic acid diethanolamide; and an allyl phenyl ether type surfactant such as polyoxyalkylene allyl phenyl ether.

These surfactants may be used alone or in a combination of two or more thereof. Among these surfactants, a nonionic surfactant is preferable, particularly, an alkanolamide type surfactant is more preferable, and dialkanolamide (for example, diethanolamide or the like) of an aliphatic carboxylic acid (for example, a saturated or unsaturated aliphatic carboxylic acid having 8 to 30 carbon atoms or the like) is still more preferable, from the viewpoint of further reducing film surface abnormality generated during manufacturing of the water-soluble film.

An upper limit of a content of the surfactant in the water-soluble film is preferably 10 parts by mass or less, more preferably 1 part by mass or less, still more preferably 0.5 parts by mass or less, and particularly preferably 0.3 parts by mass or less, with respect to 100 parts by mass of PVA. When the content of the surfactant is equal to or less than the above upper limit, it is easy to prevent the surfactant from bleeding out to the surface of the water-soluble film and the appearance of the water-soluble film from deteriorating due to aggregation of the surfactant. On the other hand, a lower limit of the content of the surfactant is preferably 0.01 parts by mass or more, more preferably 0.02 parts by mass or more, and still more preferably 0.05 parts by mass or more, with respect to 100 parts by mass of PVA. When the content of the surfactant is equal to or more than the above lower limit, it is easy to improve the peelability from the film forming apparatus when the water-soluble film is manufactured. In addition, occurrence of blocking between the water-soluble films can be easily prevented.

<Filler>

The water-soluble film of the present invention may contain a filler. By containing the filler, the mechanical strength and handleability of the water-soluble film can be improved, and since the model detergent cannot permeate the filler, a path length required for permeation in the film becomes long (hereinafter, may also be referred to as a baffle plate effect), such that improvement of a barrier performance can be expected.

Examples of the filler include carbon black, metal powder, silica, alumina, calcium carbonate, titanium dioxide, and clay minerals such as talc, mica, and bentonite. Among them, clay minerals such as talc, mica, and bentonite that have a large aspect ratio and can be expected to have a greater baffle effect are preferable.

An upper limit of a content of the filler in the water-soluble film is preferably 40 parts by mass or less, more preferably 20 parts by mass or less, and still more preferably 10 parts by mass or less, with respect to 100 parts by mass of PVA. When the content of the filler is equal to or less than the above upper limit, it is easy to prevent the water-soluble film from becoming brittle and the appearance of transparency or the like from deteriorating. A lower limit of the content of the filler in the water-soluble film is preferably 0.1 parts by mass or more, more preferably 0.5 parts by mass or more, and still more preferably 1 part by mass or more, with respect to 100 parts by mass of PVA.

<Other Components>

The water-soluble film of the present invention may contain components such as moisture, an antioxidant, a UV absorber, a lubricant, a cross-linking agent, a colorant, a preservative, an antifungal agent, and other polymer compounds, in addition to a plasticizer, starch, a water-soluble polymer other than PVA, and a surfactant, as long as the effect of the present invention is not impaired. A proportion of the total mass of PVA, the plasticizer, the starch, the water-soluble polymer other than PVA, and the surfactant to the total mass of the water-soluble film of the present invention is preferably within a range of 60 to 100 mass %, more preferably within a range of 80 to 100 mass %, and still more preferably within a range of 90 to 100 mass %.

<Method for Manufacturing Water-Soluble Film>

In the present invention, a method for manufacturing a water-soluble film is not particularly limited, and a method for manufacturing a film by a casting film forming method, a wet film forming method (discharging into a poor solvent), a dry wet film forming method, a gel film forming method (a method for obtaining a water-soluble film by cooling and gelling a film forming stock solution and then extracting a solvent), and a combination thereof, which use homogenized film forming stock solution obtained by adding a solvent, an additive, and the like to PVA, or a method for manufacturing a film by any method such as a melt extrusion film forming method in which a film is manufactured by obtaining a film forming stock solution using an extruder or the like and extruding the film forming stock solution from a T-die or the like or an inflation molding method can be used. Among them, a casting film forming method or a melt extrusion film forming method is preferable because a homogeneous water-soluble film can be obtained with high productivity. Hereinafter, the casting film forming method or the melt extrusion film forming method for a water-soluble film will be described.

In a case where the water-soluble film is manufactured by the casting film forming method or the melt extrusion film forming method, the film forming stock solution is heated to remove the solvent, such that the film forming stock solution is solidified and formed into a film. The solidified film is peeled off from the support, dried by a drying roll, a drying furnace, or the like as necessary, further heat-treated as necessary, and wound, such that a roll-shaped long water-soluble film can be obtained.

An upper limit of a volatile fraction in the film forming stock solution (a concentration of volatile components such as a solvent removed by volatilization or evaporation during film manufacturing or the like) is preferably 90 mass % or less and more preferably 80 mass % or less. When the volatile fraction in the film forming stock solution is equal to or less than the above upper limit, it is easy to prevent a viscosity of the film forming stock solution from decreasing and the uniformity of the thickness of the obtained water-soluble film from being impaired. On the other hand, a lower limit of the volatile fraction in the film forming stock solution is preferably 50 mass % or more and more preferably 55 mass % or more. When the volatile fraction in the film forming stock solution is equal to or more than the above lower limit, it is easy to prevent the viscosity of the film forming stock solution from increasing and the manufacturing of the water-soluble film from being difficult.

Here, the "volatile fraction in the film forming stock solution" in the present specification refers to a volatile fraction determined by the following equation.

$$\text{Volatile fraction in film forming stock solution(mass \%)} = \{(Wa-Wb)/Wa\} \times 100$$

(In the equation, Wa represents a mass (g) of the film forming stock solution, and Wb represents a mass (g) when the film forming stock solution of Wa (g) is dried in an electric heat dryer at 105° C. for 16 hours.)

A method for adjusting the film forming stock solution is not particularly limited, and examples thereof include a method for dissolving PVA, and additives such as a plasticizer and a surfactant in a dissolution tank or the like, and a method for melt-kneading PVA in a water-containing state together with a plasticizer, a surfactant, and the like using a single-screw or twin-screw extruder. Among them, a method for dissolving in a dissolution tank or the like or a method using a twin-screw extruder is preferable.

The adjusted film forming stock solution is transferred to a T-die or the like through a pipe or the like, and discharged into a film shape onto a support through a die lip.

In the method for manufacturing a water-soluble film of the present invention, a film forming stock solution containing PVA is cast into a film shape onto a support from a die through a die lip and dried, and a draft ratio obtained by dividing a linear velocity of the support onto which the film forming stock solution is cast by a linear velocity of the film forming stock solution at the die lip is preferably 2 to 60. An upper limit of the draft ratio is preferably 50 or less, more preferably 40 or less, and particularly preferably 30 or less. When the draft ratio is equal to or less than the above upper limit, it is easy to prevent the thickness of the water-soluble film from becoming uneven and the water solubility from being reduced. On the other hand, a lower limit of the draft ratio is preferably 5 or more, more preferably 8 or more, and particularly preferably 10 or more. When the draft ratio is equal to or more than the above lower limit, it is easy to prevent the weight reduction rate of the model detergent package of the water-soluble film from being too high and the elastic modulus of the water-soluble film when the water-soluble film is stretched to 100% from being too low. Note that the linear velocity of the film forming stock solution at the die lip can be determined by dividing a volume flow rate of the film forming stock solution by an area of a die lip opening (width of die lip×lip opening).

The reason why the draft ratio affects the weight reduction rate of the model detergent package of the water-soluble film, the elastic modulus of the water-soluble film when the water-soluble film is stretched to 100%, and the complete dissolution time is not clear, but it is considered that when the draft ratio is increased, the PVA film formed by casting the film forming stock solution into a film shape onto the support is pulled between the die lip and the support, such that an entanglement of PVA molecular chains in the PVA film is released, and thus PVA crystals are easily formed during drying.

In the method for manufacturing a water-soluble film of the present invention, an upper limit of a draw ratio obtained by dividing a winding speed of the film after drying by a linear velocity of the support of the film forming stock solution is preferably 1.8 or less, more preferably 1.75 or less, and still more preferably 1.70 or less. When the draw ratio is equal to or less than the above upper limit, it is easy to prevent the water solubility of the water-soluble film from being reduced due to excessive formation of PVA crystals. On the other hand, a lower limit of the draw ratio is preferably 0.95 or more, more preferably 1.00 or more, and still more preferably 1.05 or more. When the draw ratio is equal to or more than the above lower limit, it is easy to prevent the weight reduction rate of the model detergent package of the water-soluble film from being too high and the elastic modulus of the water-soluble film when the water-soluble film is stretched to 100% from being too low.

The reason why the weight reduction rate of the model detergent package of the water-soluble film, the elastic modulus of the water-soluble film when the water-soluble film is stretched to 100%, and the complete dissolution time can be controlled by adjusting the draw ratio in the method for manufacturing a water-soluble film of the present invention is presumed as follows. That is, it can be said that the PVA film formed by casting the film forming stock solution into a film shape onto the support is in a state where tension is always applied in a flow direction (MD direction) of the PVA film in the drying process, and the PVA film is stretched substantially in the MD direction during drying together with the volume shrinkage due to volatilization of the solvent contained in the film forming stock solution. Then, when the PVA film is stretched while containing a large amount of moisture, orientation crystallization of the PVA molecules in the water-soluble film is likely to occur, and the PVA crystals are likely to be formed. As described above, since the weight reduction rate of the model detergent package of the water-soluble film and the like are presumed to depend on the amount of PVA crystals contained in the water-soluble film, it is presumed that the weight reduction rate of the model detergent package of the water-soluble film and the like can be controlled by adjusting the draw ratio in the method for manufacturing a water-soluble film of the present invention.

An upper limit of a surface temperature of the support on which the film forming stock solution is cast is preferably 110° C. or lower, more preferably 100° C. or lower, and still more preferably 95° C. or lower. When the surface temperature of the support is equal to or less than the above upper limit, it is easy to prevent the weight reduction rate of the model detergent package of the water-soluble film from being too high and the elastic modulus of the water-soluble film when the water-soluble film is stretched to 100% from being too low. On the other hand, a lower limit of the surface temperature of the support is preferably 50° C. or higher, more preferably 60° C. or higher, and still more preferably 65° C. or higher. When the surface temperature of the support is equal to or more than the above lower limit, the PVA film formed by casting the film forming stock solution into a film shape onto the support is slowly dried, such that it is easy to prevent the water solubility of the water-soluble film from being reduced due to excessive formation of PVA crystals. In addition, when the PVA film is dried, it is easy to prevent the occurrence of film surface abnormality such as foaming.

At the same time that the PVA film is heated and dried on the support, a drying speed may be adjusted by uniformly blowing hot air over the entire region of the non-contact surface side of the PVA film. An upper limit of a temperature of the hot air is preferably 105° C. or lower and more preferably 100° C. or lower. When the temperature of the hot air is equal to or less than the above upper limit, it is easy to prevent the weight reduction rate of the model detergent package of the water-soluble film from being too high and the elastic modulus when the water-soluble film is stretched to 100% from being too low. On the other hand, a lower limit of the temperature of the hot air is preferably 75° C. or higher and more preferably 85° C. or higher. When the temperature of the hot air is equal to or more than the above lower limit, it is easy to prevent the water solubility of the water-soluble film from being reduced due to excessive formation of PVA crystals. In addition, an upper limit of a velocity of the hot air is preferably 10 m/sec or less and more preferably 7 m/sec or less. A lower limit of the velocity of the hot air is preferably 1 m/sec or more and more preferably 3 m/sec or more.

The PVA film formed by casting the film forming stock solution into a film shape onto the support is dried on the support preferably at a volatile fraction of up to 5 to 50 mass %, and then the dried PVA film is peeled off, and further dried as necessary. A drying method is not particularly limited, and examples thereof include a method of bringing the PVA film into contact with the drying furnace or the drying roll. In the case of drying with a plurality of drying rolls, it is preferable to alternately bring one surface and the other surface of the PVA film into contact with the drying rolls in order to make physical properties of both of the surfaces of the obtained water-soluble film uniform. The number of drying rolls is preferably 3 or more, more preferably 4 or more, and still more preferably 5 or more. The number of drying rolls is preferably 30 or less.

An upper limit of a temperature of each of the drying furnace and the drying roll is preferably 110° C. or lower, more preferably 100° C. or lower, still more preferably 90° C. or lower, and further still more preferably 85° C. or lower. When the temperature of each of the drying furnace and the drying roll is equal to or less than the above upper limit, it is easy to prevent the weight reduction rate of the model detergent package of the water-soluble film from being too high and the elastic modulus of the water-soluble film when the water-soluble film is stretched to 100% from being too low. On the other hand, a lower limit of the temperature of each of the drying furnace and the drying roll is preferably 40° C. or higher, more preferably 45° C. or higher, and still more preferably 50° C. or higher. When the temperature of each of the drying furnace and the drying roll is equal to or more than the above lower limit, it is easy to prevent the water solubility of the water-soluble film from being impaired.

The method for manufacturing a water-soluble film of the present invention preferably includes a step of heat-treating the water-soluble film at 80 to 300° C. By performing the heat treatment, the weight reduction rate of the model detergent package of the water-soluble film, the elastic modulus of the water-soluble film when the water-soluble film is stretched to 100%, and the complete dissolution time can be adjusted. An upper limit of the temperature of the heat treatment is preferably 280° C. or lower, more preferably 260° C. or lower, and particularly preferably 240° C. or lower. When the temperature of the heat treatment is equal to or less than the above upper limit, it is easy to prevent the weight reduction rate of the model detergent package of the water-soluble film from increasing, the elastic modulus when the water-soluble film is stretched to 100% from being reduced, and wrinkles of the package from deteriorating over time. On the other hand, a lower limit of the temperature of the heat treatment is preferably or higher, more preferably 100° C. or higher, and particularly preferably 105° C. or higher. When the temperature of the heat treatment is equal to or more than the above lower limit, it is easy to prevent the water solubility of the water-soluble film from being impaired.

The water-soluble film manufactured as described above is further subjected to a humidity control treatment, embossing processing, cutting of both ends (ears) of the film, and the like as necessary, and then the film is wound into a roll shape on a cylindrical core.

An upper limit of a volatile fraction in the water-soluble film finally obtained by a series of treatments is preferably 5 mass % or less and more preferably 4 mass % or less. A lower limit of the volatile fraction in the water-soluble film is preferably 1 mass % or more and more preferably 2 mass % or more.

<Application>

The water-soluble film of the present invention can be suitably used for various applications of the water-soluble film. Examples of such a water-soluble film include a film for packaging a chemical agent, a base film for liquid pressure transfer, a base film for embroidering, a release film for forming artificial marble, a film for packaging seeds, and a film for a waste storage bag. Among them, the water-soluble film of the present invention is preferably used as a film for packaging a chemical agent because the effect of the present invention is more remarkably exhibited.

In a case where the water-soluble film of the present invention is used as a film for packaging a chemical agent, examples of the type of chemical agent include an agricultural chemical, a detergent (including a bleaching agent), and a disinfectant. Physical properties of the chemical agent are not particularly limited, and may be acidic, neutral, or alkaline. In addition, a boron-containing compound is contained in the chemical agent. The form of the chemical agent may be any of a powder form, a lump form, a gel form, and a liquid form. The packaging form is not particularly limited, but a unit packaging form in which a chemical agent is packaged (preferably sealed packaging) unit by unit is preferable. Used the film of the present invention as a film for packaging a chemical agent to package a chemical agent, the package of the present invention is obtained.

EXAMPLES

Hereinafter, the present invention will be specifically described with reference to Examples and the like, but the present invention is not limited by the following Examples.

(1) Weight Reduction Rate of Model Detergent Package

A weight reduction rate of a model detergent package when the model detergent package was stored at 23° C. and 50% RH was determined by the method described above.

(2) Elastic Modulus of Water-Soluble Film When Stretched to 100%

An elastic modulus when the water-soluble film was stretched to 100% when the water-soluble film was immersed in the model detergent in an environment of 23° C. and 50% RH for 24 hours and then a tensile test was conducted at 23° C. and 50% RH was measured by the method described above.

(3) Complete Dissolution Time of Water-Soluble Film

A complete dissolution time of the water-soluble film when the water-soluble film was immersed in deionized water at 5° C. after the water-soluble film was immersed in the model detergent in an environment of 23° C. and 50% RH for 24 hours was measured by the method described above.

(4) Evaluation of Appearance of Model Detergent Package after Storage at 50° C. for 2 Weeks A change in appearance of the model detergent package of the water-soluble film over time when the model detergent package was stored at a high temperature for a long period of time was evaluated by the following methods <1> to <5>.
- <1> Two test pieces having a size of 7 cm×7 cm were cut out from the water-soluble film.
- <2> Two cut films are overlapped with each other, and three sides thereof are heat-sealed with a seal width of 1 cm, thereby preparing a pouch with one open side.
- <3> The model detergent with 20 cm 3 was placed in the pouch, the seal width was adjusted so that the film was stretched without wrinkles on a surface of the pouch, and the remaining one side was heat-sealed, thereby preparing a model detergent package.
- <4>30 model detergent packages described above were prepared, placed in hot air-drying set to 50° C., and then stored for 2 weeks.
- <5> After 2 weeks, the model detergent packages were taken out and then allowed to stand in a room at 23° C. and 50% RH for 4 hours, and then the appearance of each of the model detergent packages was observed and evaluated according to the following criteria.
- A: Number of model detergent packages with wrinkles observed on surface is 1 or less
- B: Number of model detergent packages with wrinkles observed on surface is 2 or 3 (10% or less of all model detergent packages)
- C: Number of model detergent packages with wrinkles observed on surface is 4 or more Example 1

100 parts by mass of carboxylic acid modified PVA modified with 4 mol % monomethyl maleate (MMM) (saponification degree: 96 mol %, polymerization degree: 1,200) obtained by saponifying polyvinyl acetate modified with 4 mol % MMM, 25 parts by mass of glycerin as a polyhydric alcohol plasticizer, 0.2 parts by mass of lauric acid diethanolamide as a surfactant, and water were put into a twin-screw extruder and then a film forming stock solution having a volatile fraction of 60 mass % was prepared. The film forming stock solution was discharged onto a metal roll (support) having a surface temperature of 90° C. from a T-die through a die lip at a draft ratio of 11, and the film forming stock solution was cast and then dried by bowing hot air at 100° C. at a speed of 5 m/sec to the entire non-contact surface with the support. Next, the PVA film was peeled off from the support and then dried from a second drying roll to a final drying roll so that one surface and the other surface of the PVA film were alternately brought into contact with each drying roll. All the surface temperatures of the second drying roll to the final drying roll were 80° C. Next, one surface and the other surface of the PVA film were alternately brought into contact with two heat treatment rolls having a surface temperature of 110° C., a heat treatment was performed, and then the PVA film was wound around a vinyl chloride roll core. A draw ratio from the support to the winding was 1.4. As a result, a water-soluble film (thickness: 40 μm, length: 1,200 m, width: 1 m) was obtained.

The weight reduction rate of the model detergent package, the elastic modulus when the water-soluble film was stretched to 100%, and the complete dissolution time were measured using the obtained water-soluble film. Furthermore, evaluation of the appearance of the model detergent package after stored at 50° C. for 2 weeks was performed. The results are shown in Table 1.

Example 2

A water-soluble film was obtained in the same manner as that of Example 1, except that the amount of glycerin as a polyhydric alcohol plasticizer was changed to 35 parts by mass with respect to 100 parts by mass of PVA, the draft ratio between the T-die and the support was changed to 31, the surface temperature of the support was changed to 80° C., the temperature of the hot air blown to the entire non-contact surface with the support was changed to 90° C., the surface temperature of the heat treatment roll was changed to 180° C., and the draw ratio from the support to the winding was changed to 1.8. The weight reduction rate of the model detergent package, the elastic modulus when the water-soluble film was stretched to 100%, and the complete dissolution time were measured using the obtained water-soluble film. Furthermore, evaluation of the appearance of the model detergent package after stored at 50° C. for 2 weeks was performed. The results are shown in Table 1.

Examples 3 to 5

Water-soluble films were obtained in the same manner as that of Example 1, except that carboxylic acid modified PVA modified with 4 mol % MMM (saponification degree: 96 mol %, polymerization degree: 1,200) was changed to unmodified PVA (saponification degree: 88 mol %, polymerization degree: 1,000) in Example 3, carboxylic acid modified PVA modified with 4 mol % MMM (saponification degree: 96 mol %, polymerization degree: 1,200) was changed to carboxylic acid modified PVA modified with 4 mol % MMM (saponification degree: 88 mol %, polymerization degree: 1,200) in Example 4, and carboxylic acid modified PVA modified with 4 mol % MMM (saponification degree: 96 mol %, polymerization degree: 1,200) was changed to sulfonic acid modified PVA modified with 2 mol % 2-acrylamido-2-methylpropyl sulfonic acid (AMPS) (saponification degree: 99 mol %, polymerization degree: 1,200) in Example 5. The weight reduction rate of the model detergent package, the elastic modulus when the water-soluble film was stretched to 100%, and the complete dissolution time were measured using the obtained water-soluble film. Furthermore, evaluation of the appearance of the model detergent package after stored at 50° C. for 2 weeks was performed. The results are shown in Table 1.

Example 6

A water-soluble film was obtained in the same manner as that of Example 3, except that bentonite ("Kunipia-F" manufactured by Kunimine Industries Co., Ltd.) as a filler was added to a twin-screw extruder in an amount of 2 parts by mass with respect to 100 parts by mass of PVA, and the volatile fraction in the film forming stock solution was set to 60 mass %. The weight reduction rate of the model detergent package, the elastic modulus when the water-soluble film was stretched to 100%, and the complete dissolution time were measured using the obtained water-soluble film. Furthermore, evaluation of the appearance of the model detergent package after stored at 50° C. for 2 weeks was performed. The results are shown in Table 1.

Example 7

A water-soluble film was obtained in the same manner as that of Example 2, except that carboxylic acid modified PVA modified with 4 mol % MMM (saponification degree: 96 mol %, polymerization degree: 1,200) was changed to unmodified PVA (saponification degree: 88 mol %, polymerization degree: 1,000), and the amount of glycerin as a polyhydric alcohol plasticizer was changed to 25 parts by mass with respect to 100 parts by mass of the unmodified PVA. The weight reduction rate of the model detergent package, the elastic modulus when the water-soluble film was stretched to 100%, and the complete dissolution time were measured using the obtained water-soluble film. Furthermore, evaluation of the appearance of the model detergent package after stored at 50° C. for 2 weeks was performed. The results are shown in Table 1.

Example 8

A water-soluble film was obtained in the same manner as that of Example 3, except that the draft ratio between the T-die and the support was changed to 3, the surface temperature of the support was changed to 105° C., the temperature of the hot air blown to the entire non-contact surface with the support was changed to 105° C., and the surface temperature of the heat treatment roll was changed to 180° C. The weight reduction rate of the model detergent package, the elastic modulus when the water-soluble film was stretched to 100%, and the complete dissolution time were measured using the obtained water-soluble film. Furthermore, evaluation of the appearance of the model detergent package after stored at 50° C. for 2 weeks was performed. The results are shown in Table 1.

Comparative Examples 1 and 2

A water-soluble film was obtained in the same manner as that of Example 3, except that the draft ratio between the T-die and the support was changed to 1.2 and the draw ratio from the support to the winding was changed to 0.8 in Comparative Example 1, and the draft ratio between the T-die and the support was changed to 65 and the draw ratio from the support to the winding was changed to 2.1 in Comparative Example 2. The weight reduction rate of the model detergent package, the elastic modulus when the water-soluble film was stretched to 100%, and the complete dissolution time were measured using the obtained water-soluble film. Furthermore, evaluation of the appearance of the model detergent package after stored at 50° C. for 2 weeks was performed. The results are shown in Table 1.

Comparative Example 3

A water-soluble film was obtained in the same manner as that of Example 1, except that carboxylic acid modified PVA modified with 4 mol % MMM (saponification degree: 96 mol %, polymerization degree: 1,200) was changed to unmodified PVA (saponification degree: 99 mol %, polymerization degree: 1,000). The weight reduction rate of the model detergent package, the elastic modulus when the water-soluble film was stretched to 100%, and the complete dissolution time were measured using the obtained water-soluble film. Furthermore, evaluation of the appearance of the model detergent package after stored at 50° C. for 2 weeks was performed. The results are shown in Table 1.

Comparative Example 4

A water-soluble film was obtained in the same manner as that of Example 1, except that the draft ratio between the T-die and the support was changed to 1.2, the surface temperature of the heat treatment roll was changed to 40° C., and the draw ratio from the support to the winding was changed to 0.8. The weight reduction rate of the model detergent package, the elastic modulus when the water-soluble film was stretched to 100%, and the complete dissolution time were measured using the obtained water-soluble film. Furthermore, evaluation of the appearance of the model detergent package after stored at 50° C. for 2 weeks was performed. The results are shown in Table 1.

TABLE 1

| | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|---|
| Film forming stock solution | PVA | Polymerization degree | 1200 | 1200 | 1000 | 1200 | 1200 | 1000 | 1000 | 1000 | 1000 | 1000 | 1000 | 1200 |
| | | Saponification degree (mol %) | 96 | 96 | 88 | 88 | 99 | 88 | 88 | 88 | 88 | 88 | 99 | 96 |
| | | Modification | MMM[a] | MMM | — | MMM | AMPS[b] | — | — | — | — | — | — | MMM |
| | | Copolymerization Modification degree (mol %) | 4 | 4 | — | 4 | 2 | — | — | — | — | — | — | 4 |
| | Polyhydric alcohol plasticizer | Amount added (part(s) by mass/PVA) | 25 | 35 | 25 | 25 | 25 | 25 | 25 | 25 | 25 | 25 | 25 | 25 |
| | Filler | Type | — | — | — | — | — | Bentonite[c] | — | — | — | — | — | — |
| | | Amount added (part(s) by mass/PVA) | — | — | — | — | — | 2 | — | — | — | — | — | — |
| Film forming conditions | | Draft ratio between T-die and support | 11 | 31 | 11 | 11 | 11 | 11 | 31 | 3 | 1.2 | 65 | 11 | 1.2 |
| | | Support temperature (° C.) | 90 | 80 | 90 | 90 | 90 | 90 | 80 | 105 | 90 | 90 | 90 | 90 |
| | | Hot air temperature (° C.) | 100 | 90 | 100 | 100 | 100 | 100 | 90 | 105 | 100 | 100 | 100 | 100 |
| | | Heat treatment temperature (° C.) | 110 | 180 | 110 | 110 | 110 | 110 | 180 | 180 | 110 | 110 | 110 | 40 |
| | | Support winding draw ratio | 1.4 | 1.8 | 1.4 | 1.4 | 1.4 | 1.4 | 1.8 | 1.4 | 0.8 | 2.1 | 1.4 | 0.8 |
| Film thickness (μm) | | | 40 | 40 | 40 | 40 | 40 | 40 | 40 | 40 | 40 | 40 | 40 | 40 |
| Film physical properties | | Weight reduction rate (g/(m² · day)) | 4.1 | 2.1 | 2.8 | 5.7 | 2.6 | 1.9 | 2.2 | 5.1 | 7.2 | 1.1 | 0.1 | 7.3 |
| | | Elastic modulus when stretched to 100% (MPa) | 19 | 28 | 32 | 12 | 27 | 34 | 34 | 22 | 18 | 38 | 36 | 8 |
| Evaluation results | | Complete dissolution time (sec) | 33 | 45 | 45 | 21 | 42 | 55 | 64 | 33 | 32 | 201 | Not dissolved | 22 |
| | | Appearance evaluation of model detergent package after storage at 50° C. for 2 weeks | B | A | B | B | A | A | A | B | C | A | A | C |

[a]MMM = monomethyl maleate
[b]AMPS = 2-acrylamino-2-methylpropyl sulfonic acid
[c]Kunipia-F manufactured by Kunimine Industries Co., Ltd.

The invention claimed is:

1. A water-soluble film comprising polyvinyl alcohol having a polymerization degree of 100 to 3,000 and a polyhydric alcohol plasticizer in an amount of 1 to 50 parts by mass with respect to 100 parts by mass of the polyvinyl alcohol,
wherein in a case where the water-soluble film is used for a package in which a model detergent is packaged, the model detergent containing 8.6 mass % of monoethanolamine, 23.8 mass % of dodecylbenzenesulfonic acid, 9.5 mass % of propylene glycol, 23.8 mass % of a lauryl alcohol ethoxylate-7 ethylene oxide adduct, 19.1 mass % of oleic acid, 9.5 mass % of diethylene glycol, and 5.7 mass % of water, a weight reduction rate of the package when the package is stored at 23° C. and 50% RH is 1.0 to 6.0 g/(m$^2$·day) per surface area of the water-soluble film in contact with the model detergent of the package,
when the water-soluble film is immersed in the model detergent in an environment of 23° C. and 50% RH for 24 hours and then a tensile test is performed at 23° C. and 50% RH, an elastic modulus of the water-soluble film when the water-soluble film is stretched to 100% is 9 to 35 MPa, and
when the water-soluble film is immersed in the model detergent in an environment of 23° C. and 50% RH for 24 hours and then the water-soluble film is immersed in deionized water at 5° C., a complete dissolution time is within 100 seconds.

2. The water-soluble film according to claim 1, wherein the polyvinyl alcohol is carboxylic acid modified or sulfonic acid modified polyvinyl alcohol, and is polyvinyl alcohol having a saponification degree of 85 mol % or more.

3. The water-soluble film according to claim 1, wherein the polyvinyl alcohol has a polymerization degree of 500 to 1,500.

4. The water-soluble film according to claim 3, wherein the polyvinyl alcohol has a saponification degree of 80 mol % to 99.5 mol %.

5. The water-soluble film according to claim 4, wherein the polyvinyl alcohol has a saponification degree of 85 mol % to 97 mol %.

6. The water-soluble film according to claim 5, comprising the polyhydric alcohol plasticizer in an amount of 5 to 40 parts by mass with respect to 100 parts by mass of the polyvinyl alcohol.

7. The water-soluble film according to claim 6, wherein the polyhydric alcohol plasticizer is selected from ethylene glycol, glycerin, diglycerin, propylene glycol, diethylene glycol, triethylene glycol, tetraethylene glycol, trimethylolpropane, and sorbitol.

8. The water-soluble film according to claim 6, wherein the polyhydric alcohol plasticizer is glycerin.

9. The water-soluble film according to claim 6, wherein the polyvinyl alcohol is unmodified polyvinyl alcohol.

10. The water-soluble film according to claim 6, wherein the polyvinyl alcohol is sulfonic acid modified polyvinyl alcohol.

11. The water-soluble film according to claim 10, wherein the sulfonic acid modified polyvinyl alcohol is polyvinyl alcohol modified with 2-acrylamido-2-methylpropyl sulfonic acid.

12. The water-soluble film according to claim 6, wherein the polyvinyl alcohol is carboxylic acid modified polyvinyl alcohol.

13. The water-soluble film according to claim 12, wherein the carboxylic acid modified polyvinyl alcohol is polyvinyl alcohol modified with monomethyl maleate.

14. The water-soluble film according to claim 1, wherein a thickness of the water-soluble film is 5 to 80 μm.

15. A package comprising the water-soluble film according to claim 1,
wherein the package contains a chemical agent.

16. The package according to claim 15, wherein the chemical agent is an agricultural chemical, a detergent, or a disinfectant.

17. The package according to claim 15, wherein the chemical agent is a liquid form.

18. The package according to claim 17, wherein the chemical agent is a detergent.

19. A method for manufacturing the water-soluble film according to claim 1 by casting a film forming stock solution containing polyvinyl alcohol into a film shape onto a support from a die through a die lip and drying the film forming stock solution,
wherein a draft ratio obtained by dividing a linear velocity of the support on which the film forming stock solution is cast by a linear velocity of the film forming stock solution at the die lip is 2 to 60, and
a draw ratio obtained by dividing a winding speed of the film after drying by the linear velocity of the support is 0.95 to 1.8.

20. The method for manufacturing the water-soluble film according to claim 19, wherein the method includes a step of heat-treating the water-soluble film at 80 to 300° C.

* * * * *